United States Patent
Herceg et al.

(10) Patent No.: US 11,249,022 B2
(45) Date of Patent: Feb. 15, 2022

(54) METHOD AND APPARATUS FOR FLUORESCENCE LIFETIME MEASUREMENT

(71) Applicant: Nokia Technologies Oy, Espoo (FI)

(72) Inventors: Marijan Herceg, Osijek (HR); Tomislav Matic, Osijek (HR)

(73) Assignee: NOKIA TECHNOLOGIES OY, Espoo (FI)

( * ) Notice: Subject to any disclaimer, the term of this patent is extended or adjusted under 35 U.S.C. 154(b) by 1 day.

(21) Appl. No.: 16/801,396

(22) Filed: Feb. 26, 2020

(65) Prior Publication Data

US 2020/0271581 A1 Aug. 27, 2020

(30) Foreign Application Priority Data

Feb. 26, 2019 (EP) .................................. 19159243

(51) Int. Cl.
*G01N 21/64* (2006.01)

(52) U.S. Cl.
CPC ....... *G01N 21/6408* (2013.01); *G01N 21/645* (2013.01); *G01N 2021/6463* (2013.01)

(58) Field of Classification Search
CPC ............. G01N 21/6408; G01N 21/645; G01N 2021/6463
See application file for complete search history.

(56) References Cited

U.S. PATENT DOCUMENTS

| | | | |
|---|---|---|---|
| 6,326,605 B1 | 12/2001 | Modlin et al. | |
| 6,414,627 B1 | 7/2002 | McEwan | |
| 6,531,097 B1 | 3/2003 | Vojnovic et al. | |
| 9,182,479 B2 | 11/2015 | Chen et al. | |
| 9,581,688 B2 | 2/2017 | Park et al. | |
| 10,520,434 B2* | 12/2019 | Seyfried | G01N 21/6408 |
| 2004/0007675 A1* | 1/2004 | Gillispie | G01N 21/6408 250/458.1 |
| 2005/0030532 A1* | 2/2005 | Kotani | G01N 21/6408 356/318 |

(Continued)

FOREIGN PATENT DOCUMENTS

| | | |
|---|---|---|
| CN | 107688012 A | 2/2018 |
| WO | 2017/202980 A1 | 11/2017 |
| WO | 2018/100083 A1 | 6/2018 |

OTHER PUBLICATIONS

"Fluorescence-Lifetime Imaging Microscopy", Methods in Cell Biology, 2013, 14 pages.

(Continued)

*Primary Examiner* — David P Porta
*Assistant Examiner* — Djura Malevic
(74) *Attorney, Agent, or Firm* — Alston & Bird LLP

(57) ABSTRACT

A method, apparatus and computer program product are provided to determine the fluorescence lifetime in an efficient manner. In the context of a method electric charge generated by fluorescence emission during two overlapping time periods of a single measurement cycle is stored to form first and second measures. The electric charge generated during that segment of the two time periods during which the two time periods overlap is incorporated in the first measure and in the second measure. The method also includes determining a fluorescence lifetime based at least in part upon the first and second measures.

19 Claims, 5 Drawing Sheets

(56) References Cited

U.S. PATENT DOCUMENTS

| | | | | |
|---|---|---|---|---|
| 2006/0275771 | A1* | 12/2006 | Suzuki | G01N 21/6408 435/6.11 |
| 2007/0223006 | A1* | 9/2007 | Tearney | G01N 21/6408 356/498 |
| 2009/0002691 | A1 | 1/2009 | Siemiarczuk et al. | |
| 2009/0095911 | A1* | 4/2009 | Kim | G01N 21/6408 250/363.01 |
| 2013/0183676 | A1* | 7/2013 | Chen | G01N 21/6408 435/6.12 |
| 2014/0253713 | A1* | 9/2014 | Zhai | G01S 17/89 348/80 |
| 2015/0123013 | A1 | 5/2015 | Schneider et al. | |
| 2015/0293021 | A1* | 10/2015 | Finkelstein | G01N 21/7703 506/13 |
| 2017/0006241 | A1 | 1/2017 | Shishido et al. | |
| 2017/0038299 | A1* | 2/2017 | Long | G01N 21/6408 |
| 2018/0313688 | A1* | 11/2018 | Dieguez Barrientos | G01J 1/0238 |
| 2019/0339201 | A1* | 11/2019 | Seyfried | G01N 21/6408 |
| 2019/0383740 | A1* | 12/2019 | Lee | G01J 1/44 |
| 2020/0217716 | A1* | 7/2020 | Imoto | G01N 21/6408 |
| 2020/0271581 | A1* | 8/2020 | Herceg | G01J 1/46 |
| 2020/0350924 | A1* | 11/2020 | Matic | G01D 5/24 |

OTHER PUBLICATIONS

Urano et al., "Selective Molecular Imaging of Viable Cancer Cells with pH-Activatable Fluorescence Probes", Nature Medicine, vol. 15, Jan. 2009, pp. 1-16.

Li et al., "A Time-Resolved CMOS Image Sensor with Draining-Only Modulation Pixels for Fluorescence Lifetime maging", IEEE Transactions on Electron Devices, vol. 59, No. 10, Oct. 2012, pp. 2715-2722.

Fu et al., "CMOS Sensor for Dual Fluorescence Intensity and Lifetime Sensing using Multicycle Charge Modulation", IEEE Custom Integrated Circuits Conference (CICC), Apr. 30-May 3, 2017, pp. 1-4.

Fu et al., "CMOS Luminescence Imager with Ambient Light Compensation and Lifetime to Frequency Conversion", IEEE Transactions on Biomedical Circuits and Systems, vol. 12, No. 5, Oct. 2018, pp. 1038-1045.

Seo et al., "A 10 Ps Time-Resolution CMOS Image Sensor with Two-Tap True-CDS Lock-in Pixels for Fluorescence Lifetime Imaging", IEEE Journal of Solid-State Circuits, vol. 51, No. 1, Jan. 2016, pp. 141-154.

Jung et al., "A 3-5 Ghz Fully Integrated CMOS UWB Radar Chip", European Radar Conference, Oct. 9-11, 2013, pp. 57-60.

Kao et al., "A Direct-sampling Pulsed Time-of-flight Radar with Frequency-defined Vernier Digital-to-Time Converter in 65 nm CMOS", IEEE Journal of Solid-State Circuits, vol. 50, No. 11, Nov. 2015, pp. 2665-2677.

Pickup et al., "Fluorescence Intensity- and Lifetime-Based Glucose Sensing Using Glucose/Galactose-Binding Protein", Journal of Diabetes Science and Technology, vol. 7, No. 1, Jan. 2013, pp. 62-71.

Berezin et al., "Near-Infrared Fluorescence Lifetime pH-Sensitive Probes", Biophysical Journal, vol. 100, No. 8, Apr. 2011, pp. 2063-2072.

Marcu, "Fluorescence Lifetime Techniques in Medical Applications", Annals of Biomedical Engineering, vol. 40, No. 2, Feb. 2012, pp. 304-331.

Berezin et al., "Fluorescence Lifetime Measurements and Biological Imaging", Chemical Reviews, vol. 110, No. 5, 2010, pp. 1-61.

Extended European Search Report received for corresponding European Patent Application No. 19159243.5, dated Sep. 23, 2019, 10 pages.

"Optimized Gating Scheme for Rapid Lifetime Determinations of Single-Exponential Luminescence Lifetimes", Analytical Chemistry, vol. 73, No. 18, Sep. 15, 2001, pp. 4486-4490.

Li et al., "A Novel Three Observation-Windows Measurement Scheme for SPAD Fluorescence Lifetime Imaging Detector", China Semiconductor Technology International Conference (CSTIC), Mar. 11-12, 2018, 3 pages.

Li et al., "Time-Domain Fluorescence Lifetime Imaging Techniques Suitable for Solid-State Imaging Sensor Arrays", Sensors, vol. 12, 2012, pp. 5650-5669.

\* cited by examiner

METHOD AND APPARATUS FOR FLUORESCENCE LIFETIME MEASUREMENT

TECHNOLOGICAL FIELD

An example embodiment relates generally to a method, apparatus and computer program product for fluorescence lifetime measurement and, more particularly, to a method, apparatus and computer program product for determining the fluorescence lifetime based upon the electric charge generated by fluorescence emission during two overlapping periods of a single measurement cycle.

BACKGROUND

Various measures of fluorescence, such as fluorescence intensity and fluorescence lifetime, may be employed for a variety of purposes including the analysis of various materials, including applications involving oxygen sensing and various biological and medical applications. In this regard, in an instance in which a molecule absorbs a photon of appropriate energy, a chain of photophysical events is triggered. These photophysical events include internal conversion or vibrational relaxation, both of which result in the loss of energy in the absence of light of emission. The chain of photophysical events also includes fluorescence, intersystem crossing, such as from a singlet state to a triplet state, and phosphorescence. Each of these photophysical events occurs with a certain probability characterized by decay rate constants k. The average length of time $\tau$ for a molecule to decay from one state to another is reciprocally proportional to the rate of decay that is, $\tau=1/k$. This average length of time is the mean lifetime and is generally referenced as the lifetime. With respect to the foregoing photophysical events, the lifetime of a photophysical event is the time required by a population of N electronically excited molecules to be reduced by a factor of e. The lifetime of photophysical processes varies significantly, such as from tens of femto seconds for internal conversion to nanoseconds for fluorescence and microseconds or seconds for phosphorescence.

The fluorescence lifetime is the time required by a population of excited fluorophores to decrease exponentially by N/e via the loss of energy through fluorescence and other non-radiative processes. Fluorescence lifetime is an intrinsic property of fluorophore and, as such, does not depend upon a method of measurement. Fluorescence lifetime can be considered as a state function because fluorescence lifetime does not depend on initial perturbation conditions, such as the wavelength of excitation, the duration of light exposure, excitation by one or multiple photons, the method of measurement or photobleaching.

Fluorescence lifetime is largely independent of the fluorescence intensity and the fluorophore concentration. Since fluorescence is affiliated with an energetically unstable state, the fluorescence lifetime is sensitive to a number of internal factors defined by the fluorophore structure and external factors that include temperature, polarity and the presence of fluorescence quenchers.

Fluorescence intensity has an image quality that is affected by various artifacts, such as background light, the concentration of the dye, photobleaching, etc. However, as described above, fluorescence lifetime is independent of such artifacts and the combination of environmental sensitivity and parametric independence causes fluorescence lifetime to be a more robust measure in many circumstances than fluorescence intensity. By way of example of the applications in which fluorescence lifetime by be employed, fluorescence lifetime sensing and fluorescence lifetime imaging are employed in various biological or medical applications. In this regard, fluorescence lifetime sensing provides for the measurement of glucose in a sample and the pH level of the sample, while fluorescence lifetime imaging facilitates the diagnosis of human diseases including some forms of cancer, e.g. cancer of the gastrointestinal tract, lung cancer, cancer of the head and neck and brain cancer, certain skin and eye diseases and atherosclerotic cardiovascular disease, as well as in DNA sequencing.

However, the measurement of fluorescence lifetime may be inefficient from a temporal perspective, at least in instances in which the fluorescence is relatively weak. In these instances of weak fluorescence, the measurement of fluorescence lifetime generally employs multi-cycle charge modulation using, for example, a complementary metal oxide semiconductor (CMOS) sensor. During the multi-cycle charge modulation process photocharges are captured during two separate time windows during each of a plurality of integration cycles. For example, the photocharges during a first time window may be captured for a fixed number of integration cycles N. Thereafter, the photocharges during a second, distinct time window may be captured during another N integration cycles. Based upon the photocharges that have been captured during the two separate time windows, a measure of the fluorescence lifetime is obtained. However, the process of collecting the photocharges in the two separate time windows requires multiple measurement cycles, with the number of measurement cycles increasing in instances in which the fluorescence is relatively weak such that multiple measurement cycles are required to capture a sufficient quantity of the photocharges for measurement purposes.

As a result of the multiple measurement cycles, the time required to measure the fluorescence lifetime is increased, thereby reducing the speed with which the fluorescence lifetime may be measured. In addition, the increased number of measurement cycles required to measure the fluorescence lifetime also increases the power consumption required to measure the fluorescence lifetime. In this regard, a sensor, such as a light-sensitive diode, must be powered on during each measurement cycle in order to receive the incident light such that an increase in the number of measurement cycles correspondingly increases the power consumed by the sensor.

BRIEF SUMMARY

A method, apparatus and computer program product are provided in accordance with an example embodiment in order to determine the fluorescence lifetime in an efficient manner. In this regard, the method, apparatus and computer program product are configured to determine the fluorescence lifetime based upon electric charge generated by fluorescence emission during two overlapping periods of a single measurement cycle. By capturing the electric charge during two overlapping time periods of single measurement cycle, the fluorescence lifetime may be determined more expeditiously and correspondingly the power consumed in conjunction with the fluorescence lifetime measurement, such as by a diode that converts incident light to current for fluorescence lifetime measurement purposes may be conserved.

In an example embodiment, a method is provided that includes storing electric charge generated by fluorescence emission during two overlapping time periods of a single measurement cycle to form first and second measures. The electric charge generated during that segment of the two time periods during which the two time periods overlap is incorporated in the first measure and the second measure. The method also includes determining a fluorescence lifetime based at least in part upon the first and second measures.

In relation to storing electric charge, the method of an example embodiment stores electric charge generated by fluorescence emission during first, second and third non-overlapping time segments of the single measurement cycle. In this example embodiment, the method also includes combining the electric charge stored during the first and second time segments to form the first measure and combining the electric charge stored during the second and third time segments to form the second measure. The method of this example embodiment also includes repeatedly storing electric charge and combining the electric charge during a plurality of measurement cycles prior to determining the fluorescence lifetime. In relation to repeatedly storing electric charge during a respective time segment, the method of this example embodiment integrates the electric charge generated by fluorescence emission during the respective time segment of the plurality of measurement cycles.

The method of an example embodiment also includes comparing the first measure to a threshold, determining a first time at which the first measure satisfies the threshold, comparing the second measure to the threshold and determining a second time at which the second measure, satisfies the threshold. In relation to determining the fluorescence lifetime, the method of this embodiment determines the fluorescence lifetime based at least in part upon the first and second times. The method of this example embodiment also includes causing the electric charge stored during the two overlapping time periods to be reset once the second measure satisfies the threshold. The method of an example embodiment also includes sensing the fluorescence emission and generating a current based thereupon. The method of this example embodiment further includes converting the current to a voltage representative of the fluorescence emission, prior to storing the electric charge.

In another example embodiment, an apparatus is provided that includes means for storing electric charge generated by fluorescence emission during two overlapping time periods of a single measurement cycle to form first and second measures. The electric charge generated during that segment of two time periods during which the two time periods overlap is incorporated in the first measure and the second measure. The apparatus also includes means for determining a fluorescence lifetime based at least in part upon the first and second measures.

The means for storing electric charge in accordance with an example embodiment comprises first, second and third storage devices configured to store electric charge generated by fluorescence emission during first, second and third non-overlapping time segments of the single measurement cycle. The apparatus of this example embodiment also includes means for combining the electric charge stored during the first and second time segments to form the first measure and combining the electric charge stored during the second and third time segments to form the second measure. The first, second and third storage devices of an example embodiment include first, second and third capacitors deposed in parallel and configured to be alternately, switchably connected to a signal line maintained at a voltage based upon the electric charge generated by the fluorescence emission. In this example embodiment, the means for combining the voltages includes a first summer configured to combine the electric charge stored during the first and second time segments to form the first measure and a second summer configured to combine the electric charge stored during the second and third time segments to form the second measure.

The apparatus of an example embodiment also includes means for comparing the first measure to a threshold, determining a first time at which the first measure satisfies the threshold, comparing the second measure to the threshold and determining a second time at which the second measure, satisfies the threshold. In this example embodiment, the means for comparing the first measure to the threshold and the second measure to the threshold includes a first comparator configured to compare the first measure to the threshold and a second comparator configured to compare the second measure to the threshold. The apparatus of an example embodiment also includes means for sensing the fluorescence emission and generating a current based thereupon. The apparatus for this example embodiment further includes means for converting the current to a voltage representative of the fluorescence emission, prior to storing the electric charge. The apparatus of this example embodiment additionally includes first, second and third intermediate storage devices configured to store the electric charge following conversion of the current during first, second and third non-overlapping time segments of the single measurement cycle.

In a further example embodiment, an apparatus is provided that includes a plurality of storage devices configured to store electric charge generated by fluorescence emission during two overlapping time periods of a single measurement cycle to form first and second measures. The electric charge generated during that segment of two time periods during which the two time periods overlap is incorporated in the first measure and the second measure. The apparatus also includes a computing device, such as processing circuitry, configured to determine the fluorescence lifetime based at least in part upon the first and second measures.

The plurality of storage devices of an example embodiment include first, second and third storage devices configured to store electric charge generated by fluorescence emission during first, second and third non-overlapping time segments of the single measurement cycle. The apparatus of this example embodiment also includes plurality of summers configured to combine the electric charge stored during the first and second time segments to form the first measure and combining the electric charge stored during the second and third time segments to form the second measure. The first, second and third storage devices of an example embodiment include first, second and third capacitors deposed in parallel and configured to be alternately, switchably connected to a signal line maintained at a voltage based upon the electric charge generated by the fluorescence emission. The plurality of summers of this example embodiment include a first summer configured to combine the electric charge during the first and second time segments to form the first measure and a second summer configured to combine the electric charge stored during the second and third time segments to form the second measure.

The apparatus of an example embodiment also includes a plurality of comparators configured to compare the first measure to a threshold and to compare the second measure to the threshold and a computing device, such as processing circuitry, to determine a first time at which the first measure satisfies the threshold and a second time at which the second measure satisfies the threshold. In this example embodiment, the plurality of comparators includes a first comparator configured to compare the first measure to the threshold and a second comparator configured to compare the second measure to the threshold.

The apparatus of an example embodiment also includes a sensor, such as a light-sensitive diode, configured to sense the fluorescence emission and to generate a current based thereupon. The apparatus of this example embodiment also includes a converter, such as an amplifier and, more particularly a transimpedance amplifier, configured to convert the current to a voltage representative of the fluorescence emission, prior to storing the electric charge. The apparatus of this example embodiment further includes first, second and third intermediate storage devices configured to store the electric charge following conversion of the current during first, second and third non-overlapping time segments of the single measurement cycle.

In yet another example embodiment, a computer program product is provided that includes at least one non-transitory computer-readable storage medium having computer executable program code instructions stored therein with the computer-executable program code instructions including program code instructions configured, upon execution, to direct storage of electric charge generated by fluorescence emission during two overlapping time periods of a single measurement cycle to form first and second measures. The electric charge generated during that segment of two time periods during which the two time periods overlap is incorporated in of the first measure and the second measure. The computer executable program code instructions also include program code instructions configured to, upon execution, determine a fluorescence lifetime based at least in part upon the first and second measures.

The computer program code instruction configured the direct storage of electric charge in accordance with an example embodiment include computer program code instructions configured to control the alternative, switchable connection of first, second and third storage devices to a signal line maintained a voltage based upon the electric charge generated by the fluorescence emission. As such, the first, second and third devices store electric charge generated by fluorescence emission during first, second and third non-overlapping time segments of the single measurement cycle.

BRIEF DESCRIPTION OF THE DRAWINGS

Figure 1:
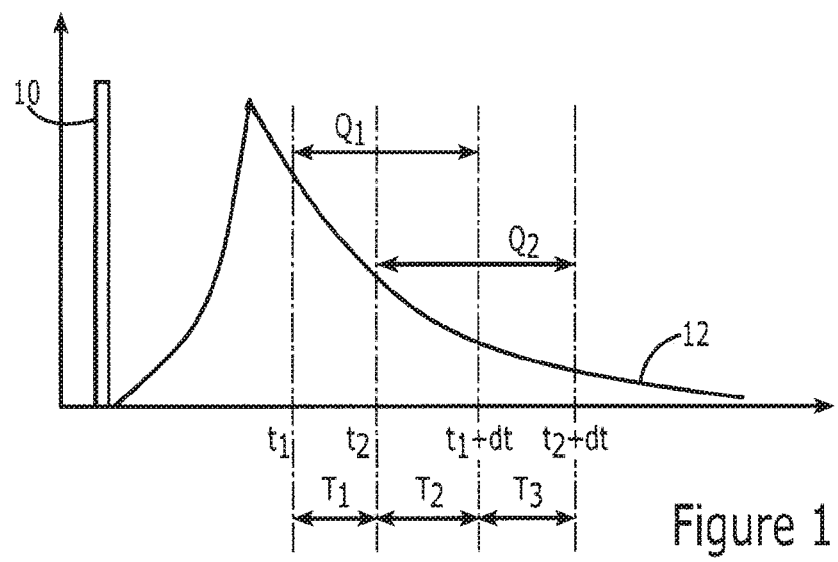
Figure 2:
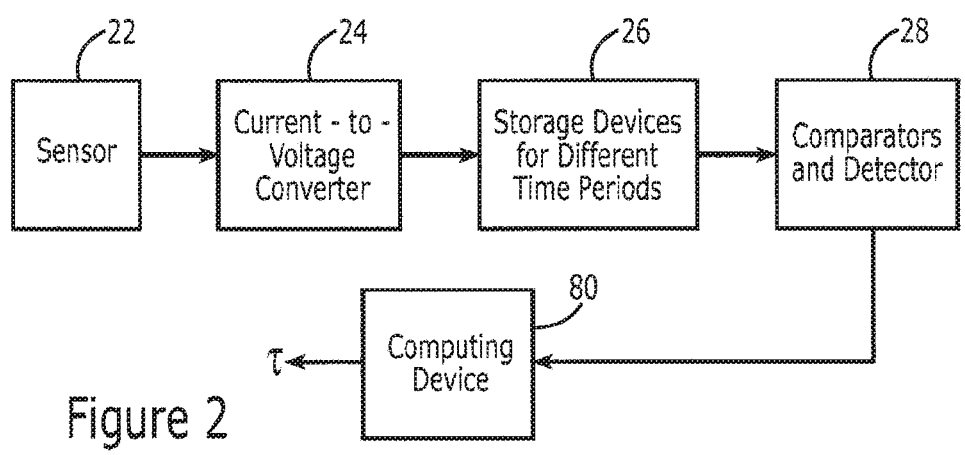
Figure 3:
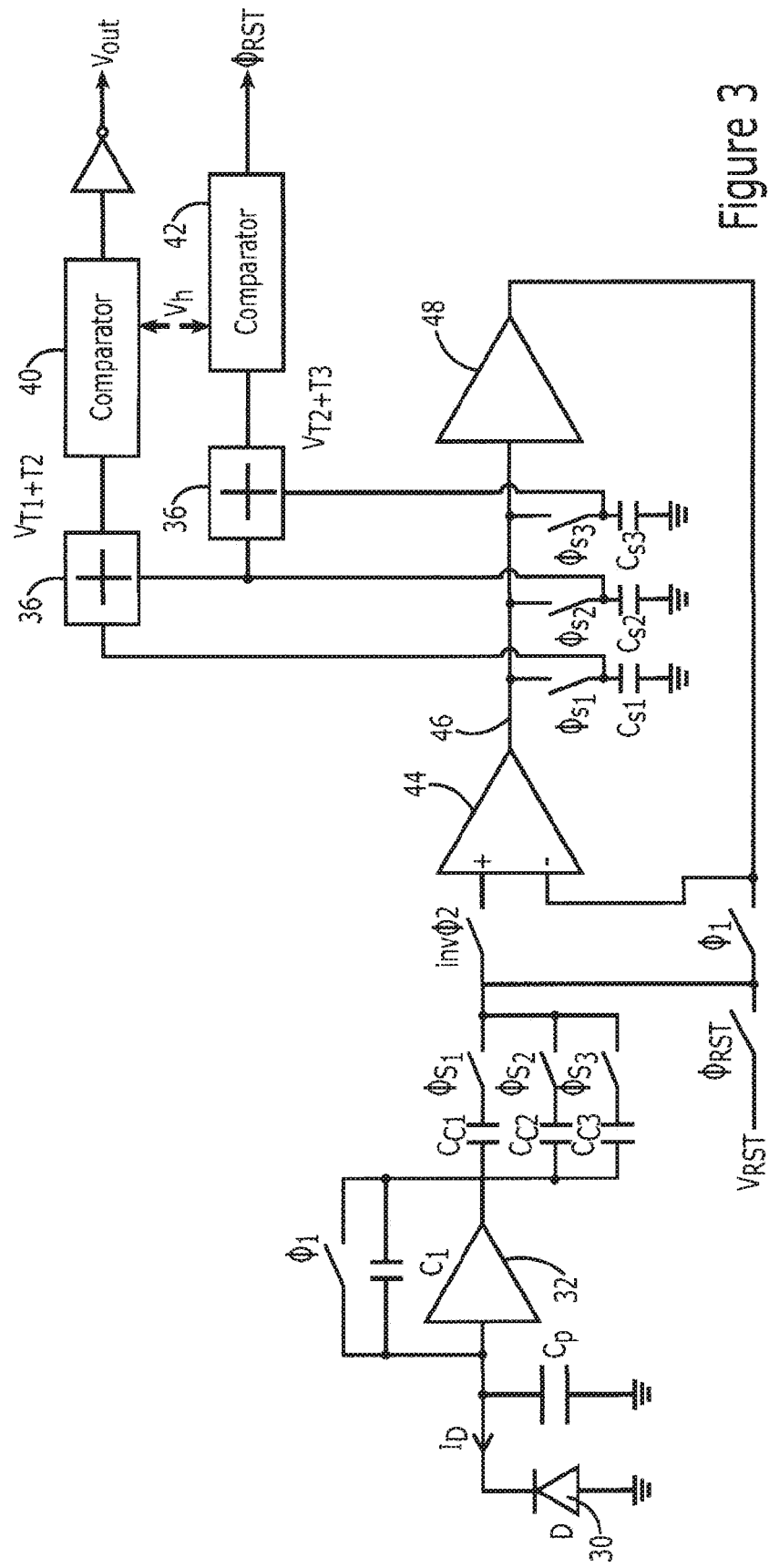
Figure 4:
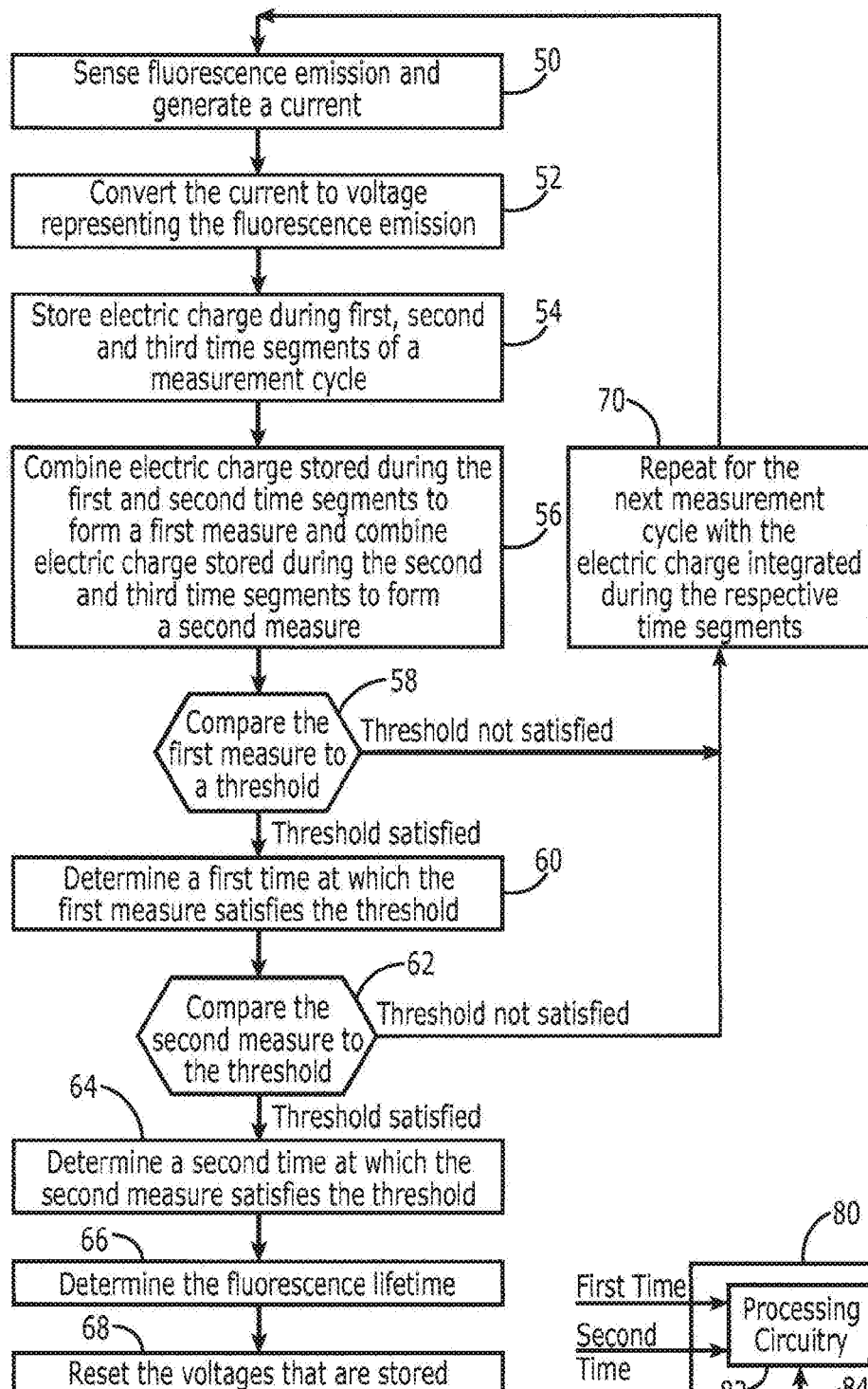
Figure 5:
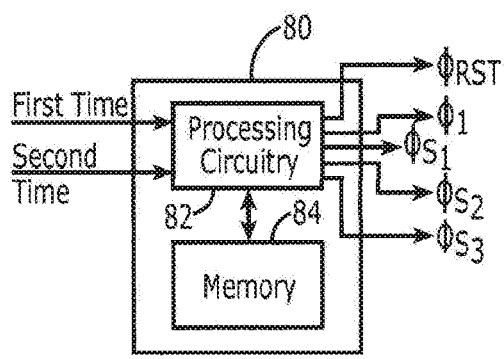
Figure 6A:
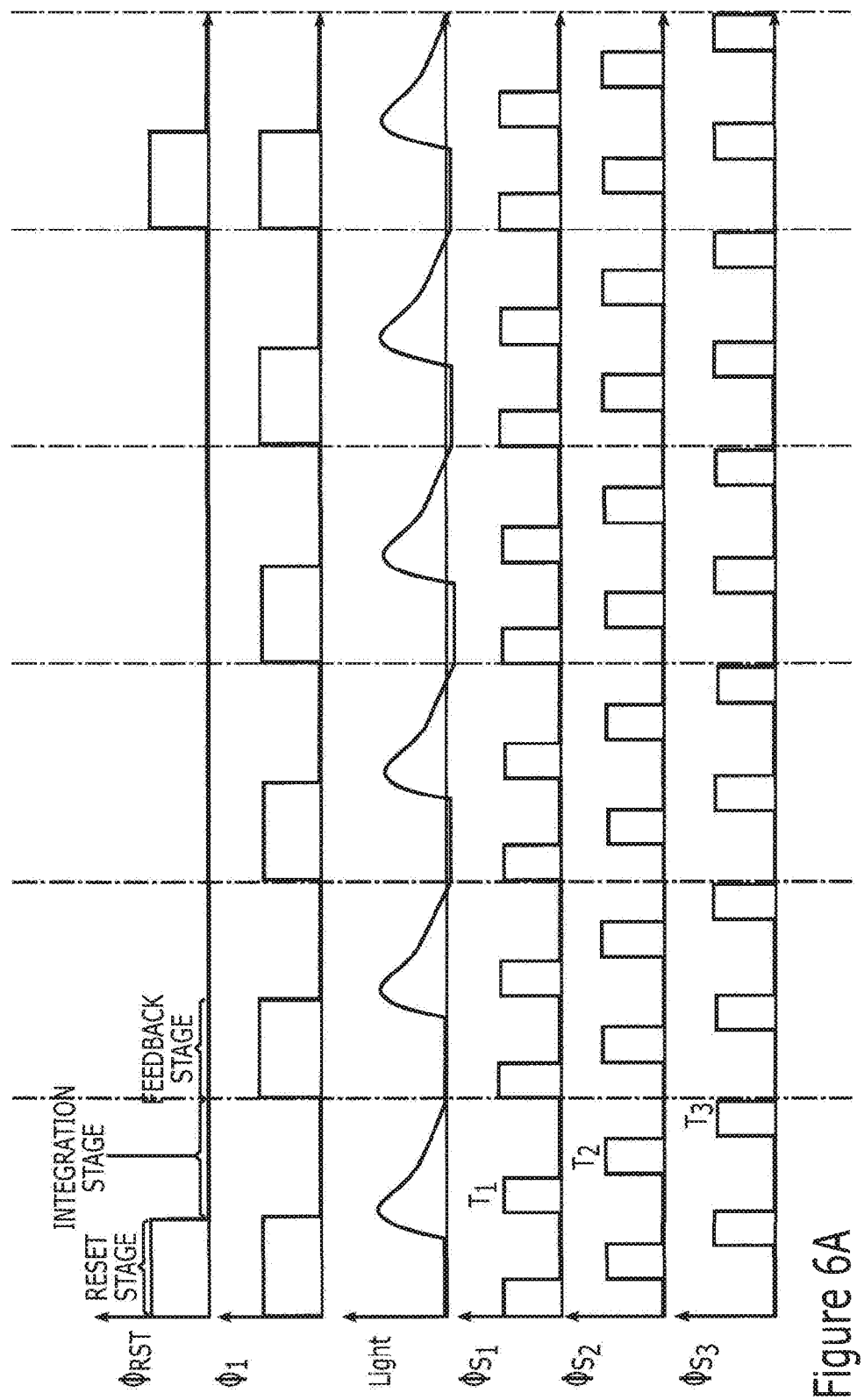
Figure 6B:
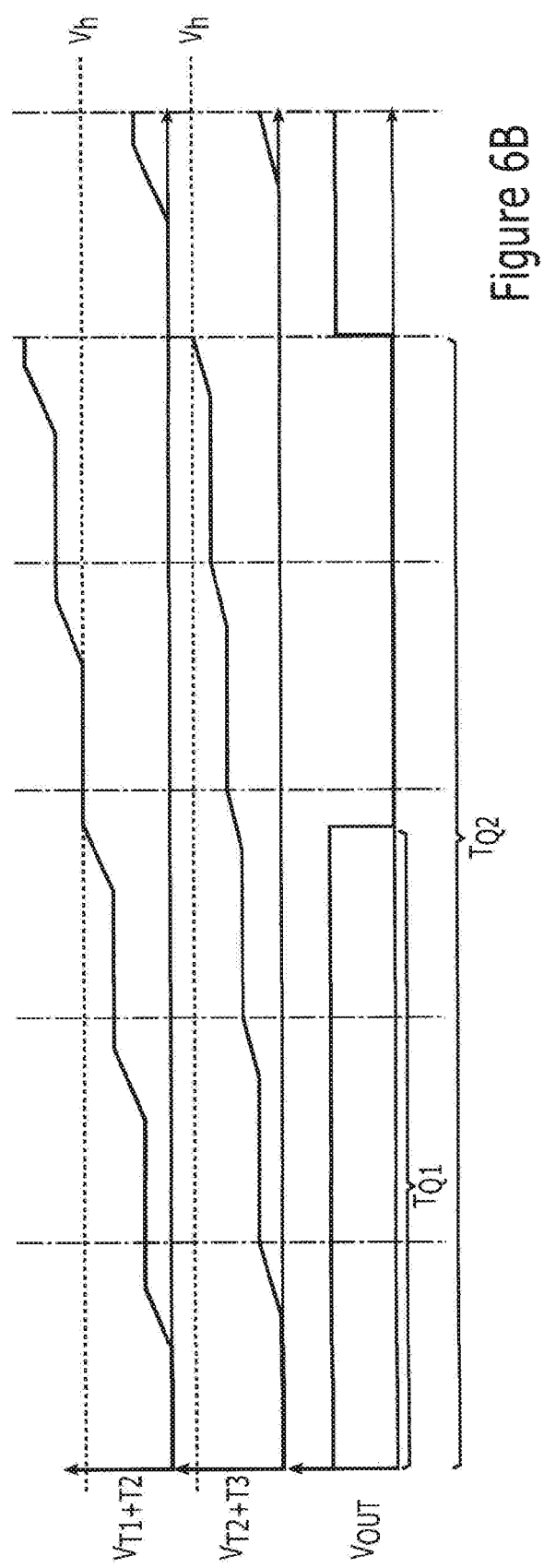

Having thus described certain example embodiments of the present disclosure in general terms, reference will hereinafter be made to the accompanying drawings, which are not necessarily drawn to scale, and wherein:

FIG. 1 is a graphical representation of the fluorescence emission generated an object undergoing analysis in response to excitation light as well as the two overlapping time periods $T_1+T_2$ and $T_2+T_3$ of a single measurement cycle during which electric charge $Q_1$ and $Q_2$, respectively, generated by fluorescence emission is stored in accordance with an example embodiment of the present disclosure;

FIG. 2 is a block diagram of an apparatus in accordance with an example embodiment of the present disclosure;

FIG. 3 is a circuit diagram of an apparatus in accordance with an example embodiment of the present disclosure;

FIG. 4 is a flow chart illustrating operations performed, such as by the apparatus of FIGS. 2 and 3, in order to determine the fluorescence lifetime based upon electric charge generated by fluorescence emission during two overlapping time periods of a single measurement cycle in accordance with an example embodiment of the present disclosure;

FIG. 5 is block diagram of an apparatus configured to determine the fluorescence lifetime in accordance with an example embodiment of the present disclosure; and FIGS. 6A and 6B are a timing diagram in relation to the circuit of FIG. 3.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

A method, apparatus and computer program product are provided in accordance with an example embodiment in order to determine the fluorescence lifetime, such as the fluorescence lifetime of an object undergoing analysis. Various objects may be subjected to analysis including, for example, a tissue sample, a blood sample or the like depending upon the application in which the method, apparatus and computer program product are employed.

As shown in FIG. 1, an object undergoing analysis may be subjected to excitation light 10, such as a pulse of excitation light. In response to the excitation light, the object undergoing analysis may fluoresce and, as result, may emit photocharges having an intensity that peaks relatively soon following the excitation light and then decays more slowly over time, such as in accordance with an exponential decay, as illustrated by graphical representation 12.

In order to determine the fluorescence lifetime of the object under analysis, the electric charge generated by fluorescence emission during two overlapping time periods of single measurement cycle is stored. Relative to FIG. 1 and as described below, the two overlapping time periods may include a first time period $Q_1$ comprised of time segments $T_1$ and $T_2$ and a second time period $Q_2$ comprised of time segments $T_2$ and $T_3$. As such, the first and second time periods overlap during time segment $T_2$.

In order to store the electric charge generated by fluorescence emission, the apparatus 20 includes means, such as a sensor 22 as depicted in FIG. 2, for sensing the fluorescence emission. Although the sensor may be configured in various manners, the sensor of an example embodiment depicted in FIG. 3 includes a light-sensitive diode 30 configured to sense the fluorescence emission, such as the photocharges generated by the object under analysis in response to the excitation light and to generate a current $I_D$ based thereupon. Reference is also made to FIG. 4 which depicts the operations performed in order to determine the fluorescence lifetime including sensing the fluorescence emission and generating a corresponding current as shown in block 50. As shown in FIG. 3, the light-sensitive diode may include a barrier capacitance represented by capacitor $C_p$ disposed in parallel with the diode.

The apparatus 20 also includes means, such as a current-to-voltage converter 24 or the like, for converting the current to a voltage representative of the fluorescence emission. See block 52 of FIG. 4. Although the current-to-voltage converter may be configured in a variety of manners, the current-to-voltage converter of an example embodiment includes an amplifier, such as a transimpedance amplifier 32, as shown in FIG. 3. In this example embodiment, the transimpedance amplifier includes an internal barrier capacitance $C_P$ as well as an external capacitor $C_1$ providing feedback between the output and the input of the transimpedance amplifier such that the voltage $V_0$ generated by the transimpedance amplifier is defined as: $V_0 = \int (I_D/C_1)\, dt$.

The apparatus 20 of an example embodiment also includes means, such as a plurality of storage devices 26 as shown in FIG. 2, configured to store electric charge generated by fluorescence emission during two overlapping time periods of a single measurement cycle to form first and second measures. The plurality of storage devices may be embodied in various manners, but, in one embodiment, are embodied by first, second and third storage devices configured to store the electric charge generated by fluorescence emission during first, second and third non-overlapping time segments of the single measurement cycle. See also block 54 of FIG. 4. With reference to the example embodiment of FIG. 3, the first, second and third storage devices include first, second and third capacitors $C_{S1}$, $C_{S2}$ and $C_{S3}$ disposed in parallel and configured to be alternately, switchably connected to a signal line 46 maintained at a voltage based upon the electric charge generated by the fluorescence emission.

The apparatus 20 of an example embodiment also includes means, such as a plurality of summers, for combining the electric charge stored during the first and second time segments $T_1$ and $T_2$ to the form the first measure and for combining the electric charge during the second and third time segments $T_2$ and $T_3$ to form the second measure. See block 56 of FIG. 4. As such, the electric charge generated during that segment, namely, the second time segment, of the two time periods during which the two time periods overlap is incorporated in the first measure and in the second measure. As shown in FIG. 3, the plurality of summers includes, in an example embodiment, a first summer 36 configured to combine the electric charge during the first and second time segments to form the first measure and a second summer 38 configured to combine the electric charge stored during the second and third time segments to form the second measure. In an example embodiment, the first and second summers may be comprised of respective summing amplifiers, each comprised of an operational amplifier circuit.

The apparatus 20 of an example embodiment also includes means, such as a plurality of comparators 28, for comparing the first measure to a threshold, for determining a first time at which the first measure satisfies the threshold, for comparing the second measure to the threshold and for determining a second time at which the second measure satisfies the threshold. See blocks 58-64 of FIG. 4 described further hereinbelow. In an example embodiment depicted in FIG. 3, the plurality of comparators include a first comparator 40 configured to compare the first measure to the threshold and a second comparator 42 configured to compare the second measure to the threshold. In an example embodiment, the first and second comparators may be comprised of respective operational amplifier comparator circuits.

The apparatus 20 of an example embodiment also includes means, such as a computing device 80 as shown in FIG. 2 and, in more detail in FIG. 5, for determining the fluorescence lifetime of the object under analysis based at least in part upon the first and second measures. In an example embodiment, the apparatus, such as the computing device, is configured to determine the fluorescent lifetime based upon the first time and the second time at which the first measure and the second measure, respectively, satisfy the threshold.

One example of a computing device 80 that may be configured to determine the fluorescence lifetime of the object under analysis is depicted in FIG. 5 and may be embodied as a computer, a mobile terminal, such as a personal digital assistant (PDA), mobile telephone, smart phone, wearable device, smart watch or a tablet computer, or a fixed computing device, such as a computer workstation or the like. As shown, the computing device includes, is associated with or is in communication with processing circuitry 82 and a memory device 84. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The computing device 80 may, in some embodiments, be embodied in various computers as described above. However, in some embodiments, the computing device may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computing device may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 82 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 82 may be configured to execute instructions stored in the memory device 84 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

Based on the fluorescence lifetime, information regarding the object under analysis may be determined. For example, based on upon the fluorescence lifetime, the glucose level and/or the pH level of the object under analysis may be identified. Additionally or alternatively, the fluorescence lifetime that is determined may provide an indication as to certain types of cancer and/or the presence of certain skin and eye diseases and/or atherosclerotic cardiovascular disease being present in the object under analysis. Further, the fluorescence lifetime may provide an indication as to the oxygen present within object under analysis.

Further details regarding the method and apparatus 20 of an example embodiment are provided below in conjunction with the timing diagram of FIGS. 6A and 6B in relation to the circuit of FIG. 3 and the operations depicted in FIG. 4. The timing diagrams of FIGS. 6A and 6B include a plurality of measurement cycles as defined by a clock signal $\phi_1$ and as depicted to be separated by vertical lines. As shown in FIG. 6A, the plurality of storage devices, such as the plurality of capacitors, are initially reset during a first measurement cycle. In the reset stage and while the clock signal $\phi_1$ is provided, a reset signal $\phi_{RST}$ is provided, such as by the computing device 80 such as the processing circuitry 82 that serves to control operation of the apparatus 20, such as the circuit of FIG. 3, and to determine the fluorescence lifetime as described below. The reset signal $\phi_{RST}$ causes the switch associated with the reset signal in FIG. 3 to be closed while the reset signal is high and to be opened when the reset signal returns to a low value. Similarly, the clock signal $\phi_1$ causes the switches associated in FIG. 3 with the clock signal to be closed in instances in which the clock signal is high and to be open in which the clock signal is low. With reference to FIG. 3, it is noted that inv$\phi_1$ is the inverse of the clock signal $\phi_1$.

While the reset signal $\phi_{RST}$ and the clock signal $\phi_1$ are provided, control signals associated with each of the plurality of storage devices are alternately and sequentially provided, such as by the computing device 80, such as the processing circuitry 82. In the illustrated embodiment of FIG. 3 in which the plurality of storage devices include first, second and third storage devices $C_{S1}$, $C_{S2}$ and $C_{S3}$ as well as first, second and third intermediate storage devices $C_{C1}$, $C_{C2}$ and $C_{C3}$ separated from, from the first, second and third storage devices by an amplifier 44, first, second and third control signals $\phi_{S1}$, $\phi_{S2}$ and $\phi_{S3}$ are alternately provided. In this regard, a first control signal $\phi_{S1}$ is initially provided during the reset stage while the reset signal $\phi_{RST}$ and the clock signal $\phi_1$ are also provided to cause the switches associated with the first storage device $C_{S1}$, e.g., the first capacitor, and the first intermediate storage device storage device $C_{C1}$, e.g., the first intermediate capacitor, to be closed, thereby causing any electric charge previously stored by the respective capacitors to be discharged and first capacitor and the first intermediate capacitor to be reset.

Following the first control signal $\phi_1$, a second control signal $\phi_{S2}$ is provided during the reset stage while the reset signal $\phi_{RST}$ and the clock signal $\phi_1$ are also provided to cause the switches associated with the second storage device $C_{S2}$, e.g., the second capacitor, and the second intermediate storage device storage device $C_{C2}$, e.g., the second intermediate capacitor, to be closed, thereby causing any electric charge previously stored by the respective capacitors to be discharged and second capacitor and the second intermediate capacitor to be reset. Similarly, following the second control signal $\phi_2$, a third control signal $\phi_3$ is provided during the reset stage while the reset signal $\phi_{RST}$ and the clock signal $\phi_1$ are also provided to cause the switches associated with the third storage device $C_{S3}$, e.g., the third capacitor, and the third intermediate storage device storage device $C_{C3}$, e.g., the third intermediate capacitor, to be closed, thereby causing any electric charge previously stored by the respective capacitors to be discharged and third capacitor and the third intermediate capacitor to be reset. As noted above, the first, second and third control signal are each provided while the reset signal $\phi_{RST}$ and the clock signal $\phi_1$ are provided, but the first, second and third control signals $\phi_{S1}$, $\phi_{S2}$ and $\phi_3$ are provided during different instances of time and, as a result, do not overlap, thereby facilitating the separate resetting of the first, second and third storage devices.

As shown in FIG. 6A, fluorescence emission in response to excitation of an object of under analysis occurs. As illustrated, the reset signal $\phi_{RST}$ and the clock signal $\phi_1$ are removed, such as by returning to a low state, during the period of time in which the fluorescence emission decays. In the illustrated example, the reset signal $\phi_{RST}$ and the clock signal $\phi_1$ are removed and returned to a low state at or near the time at which the fluorescence emission peaks and at which the decay of the fluorescence emission begins to occur. The transition of the reset signal $\phi_{RST}$ and the clock signal $\phi_1$ from a high to a low state ends the reset stage and causes the circuit to enter an integration stage for the remainder of the measurement cycle.

During the integration stage while the reset signal $\phi_{RST}$ and the clock signal $\phi_1$ are low and during the decay of the fluorescence emission, the control signals are again alternately provided to the respective storage devices. As shown in FIG. 6A, a first control signal $\phi_{S1}$ may be provided during a first time segment $T_1$, a second control signal $\phi_{S2}$ may be provided during a second time $T_2$ and a third control signal $\phi_{S3}$ may be provided during a third time segment $T_3$. In the illustrated embodiment, each time segment is of an equal duration, does not overlap with other time segments and is immediately adjacent to another time segment. However, the time segments defined by the respective control signals may have different durations, both from one another and from what is depicted in FIG. 6A, and may be spaced apart from one another in other embodiments. In this regard, the duration of the first and third time segments may be equal, but the duration of the second time segment may be different from the duration of the first and third time segments such that the duration of the first time period comprised of the first and second time segments is equal to the duration of the second time period comprised of the second and third time segments. However, the first, second and third time segments defined by the respective control signals remain non-overlapping.

While the first control signal $\phi_{S1}$ is provided during the integration stage following resetting of the capacitors, the first storage device $C_{S1}$, such as the first capacitor, is connected to a signal line 46 that is maintained at a voltage based upon the electric charge generated by the fluorescence emission. In regard to the embodiment of FIG. 3, the fluorescence emission is captured by the light-sensitive diode 30 and converted to a current $I_D$ which, in turn, is converted to a voltage by the transimpedance amplifier 32. The signal line 46 by to which the storage devices are switchably connected is maintained at this voltage level such that the first capacitor $C_{S1}$ stores electric charge in an amount corresponding to the voltage at which the signal line is maintained which, in turn, corresponds to the fluorescence emission captured by the diode during the respective time segment $T_1$. The first control signal $\phi_{S1}$ is then removed and the second control signal $\phi_{S2}$ is provided during a second time segment $T_2$. During the second time segment $T_2$, the second capacitor $C_{S2}$ stores electric charge in an amount corresponding to the voltage at which the signal line 46 is maintained which, in turn, corresponds to the fluorescence emission captured by the diode during the respective time segment $T_2$. The second control signal $\phi_{S2}$ is then removed and the third control signal $\phi_{S3}$ is provided during a third time segment $T_3$. During the third time segment $T_3$, the third capacitor $C_{S3}$ stores electric charge in an amount corresponding to the voltage at which the signal line 46 is maintained which, in turn, corresponds to the fluorescence emission captured by the diode during the respective time segment $T_3$. The third control signal $\phi_{S3}$ is then removed and the integration stage is completed.

As the fluorescence emission gradually decays during the integration stage, the first capacitor $C_{S1}$ generally stores more electric charge than the second and third capacitors $C_{S2}$ and $C_{S3}$. Similarly, the second capacitor $C_{S2}$ generally stores more electric charge than the third capacitor $C_{S3}$.

As shown in FIG. 3 the electric charge stored by the first and second storage devices is summed, such as by a first summer 36, to form the first measure and the electric charge stored by the second and third storage devices is summed, such as by a second summer 38, to form the second measure. The electric charge stored by the second storage device captured during the second time segment $T_2$ between the first time segment $T_1$ and the third time segment $T_3$ during which the first and third storage devices capture the electric charge is included in each of the first and second measures. As such, during a single measurement cycle, both the first and second measures of the electric charge generated during the two overlapping time periods, that is, a first time period $Q_1$ formed by the first and second time segments and the second time period $Q_2$ formed the second and third time segments are formed. The first and second measures are separately compared, such as by comparators 40, 42, to a threshold $V_h$ represented, for example by the horizontal dashed line in FIG. 6B.

If either the first or second measure fails to satisfy the threshold, the process is repeated during the subsequent measurement cycle. In this regard, in the second measurement cycle depicted in FIGS. 6A and 6B, a feedback stage is initially entered in which the clock signal $\phi_1$ is provided and the first, second and third control signals $\phi_{S1}$, $\phi_{S2}$ and $\phi_{S3}$ are alternately and sequentially provided while the clock signal remains high. In this manner, the electric charge stored by the storage devices is fed back through a voltage follower circuit or buffer 48 to the plurality of intermediate storage devices such that the same electric charge stored by the first, second and third storage devices during the prior integration stage is then stored by the first, second and third intermediate storage devices, respectively. By a way of example, during the feedback stage while the clock signal $\phi_1$ is provided, the first control signal $\phi_{S1}$ is initially provided so as to close the switches associated therewith. Thus, the electric charge stored by the first storage device $C_{S1}$ is fed back through the voltage follower circuit or buffer to the first intermediate storage device $C_{C1}$ and stored thereby. Subsequently and in an alternate manner, this process is repeated for both the second and third control signals $\phi_{S2}$ and $\phi_{S3}$ such that the electric charge stored by the second storage device $C_{S2}$ is fed back to the second intermediate storage device $C_{C2}$ and the electric charge stored by the third storage device $C_{S3}$ is feedback to the third intermediate storage device $Cc_3$. As before, the first, second and third control signals $\phi_{S1}$, $\phi_{S2}$ and $\phi_{S3}$ are all provided during the feedback stage while the clock signal $\phi_1$ is provided, but during different time segments $T_1$, $T_2$ and $T_3$ so as not to be overlapping.

Following the excitation of the object under analysis, the object again fluoresces and the feedback stage is ended with the removal the clock signal $\phi_1$ such that the clock returns to a low value prior to repeating the integration stage as described above. By having fed back the electric charge from the first, second and third storage devices $C_{S1}$, $C_{S2}$ and $C_{S3}$ to the first, second and third intermediate storage devices $C_{C1}$, $C_{C2}$ and $C_{C3}$, respectively, the signal line 46 is now maintained at a voltage that is the sum of the voltage representative the fluorescence emission at the particular moment in time and the voltage corresponding to the electric charge stored by a respective intermediate storage device (that is, the intermediate storage device for which the associated switch is closed) during all prior integration stages since the reset stage. In this regard, during the integration stage during which the fluorescence emission is decaying, the first control signal $\phi_{S1}$ is initially provided such that the voltage at which the signal line is maintained is the sum of voltage representative of the fluorescence emission during the first time segment $T_1$ in combination with voltage attributable to the electric charge stored by the first intermediate storage device $C_{C1}$. This process is subsequently repeated for the second control signal $\phi_{S2}$, which connects the second storage device $C_{S2}$ and the second intermediate storage device $C_{C2}$ to the signal line 46 during the second time segment $T_2$ and then for the third control signal $\phi_{S3}$ which connects the third storage device $C_{S3}$ and the third intermediate storage device $C_{C3}$ to the signal line 46 during the third time segment $T_3$. As such, the electric charge stored by the plurality of storage devices is the product of the integration of the electric charge generated during the respective time segment of each of the plurality of measurement cycles, thereby providing for measurement of relative weak fluorescence. For example, following the second measurement cycle, the electric charge stored by the first storage device $C_{C1}$ is the sum of the electric charge generated by fluorescence emission during the first time segment $T_1$ during both the first and second measurement cycles.

As shown in FIG. 6B, the electric charge stored during the first and second time segments may be combined by the first summer 36 to form the first measure (designated $V_{T1+T2}$ in FIG. 6B) and the electric charge stored during the second and third time segments may be combined by the second summer 38 to form the second measure (designated $V_{T2+T3}$ in FIG. 6B). The first and second measures are then compared to the threshold $V_h$ as shown in blocks 58 and 62 of FIG. 4 and the foregoing process is repeated as shown in block 70 in an instance which either of the first or second measures fails to satisfy the threshold.

In an instance in which the first measure satisfies the threshold $V_h$, the apparatus 20 includes means, such as computing device 80 and, more particularly, the processing circuitry 82, for determining the first time at which the first measure satisfies the threshold. See block 60 of FIG. 4. As shown in FIG. 6B, the first time $T_{Q1}$ is defined from the beginning of the first measurement cycle, such as the time at which the reset signal was initially provided, until the time at which the first measure satisfies the threshold $V_h$. In this embodiment and in an instance in which the second measure still fails to satisfy the threshold $V_h$, the process is repeated until the second measure is determined to satisfy the threshold. See blocks 60, 62 and 70 of FIG. 4. However, in an instance in which the second measure satisfies the threshold $V_h$, the apparatus includes means, such as a computing device and, more particularly, the processing circuitry, for determining the second time at which the second measure satisfies the threshold. See block 64 of FIG. 4. As shown in FIG. 6B, the first time $T_{Q2}$ is defined from the beginning of the first measurement cycle, such as the time at which the reset signal was initially provided, until the time at which the second measure satisfies the threshold $V_h$.

In accordance with an example embodiment, the apparatus 20 also includes means, such as the computing device 80 and, in one embodiment, processing circuitry 82, for determining the fluorescence lifetime based at least in part upon the first and second measures and, in an example embodiment, based upon the first and second times at which the first and second measures, respectively, satisfy the threshold. See block 66 of FIG. 4. In this regard, the apparatus, such as the processing circuitry, of an example embodiment is configured to determine the fluorescence lifetime τ as follows:

$$\tau = (t_2 - t_1)/\ln(T_{Q2}/T_{Q1})$$

wherein $t_2$ and $t_1$ are times at which the first and second time segments commence as shown in FIG. 1 and, in an instance in which the second time segment immediately follows the first time segment, $(t_2-t_1)$ represents the length of the first time segment. In instances in which each of the first, second and third time segments have the same duration, $(t_2-t_1)$ more generally represents the length of each of the time segments. Thus, the fluorescence lifetime is based upon the duty cycle, such as the inverse of the duty cycle, of the square wave representing $V_{OUT}$ that maps the information regarding fluorescence lifetime by going high at the first time prior to returning low at the second time. The resulting value of the fluorescence lifetime can then be provided, such as via various communication, e.g., wireless communication, protocols, for subsequent utilization and/or further analysis. In some embodiments, the square wave representing $V_{OUT}$ may be transmitted, such as a modulated form of the square wave, to permit remote determination and analysis of the fluorescence lifetime.

Once the measurement cycle in which the second measure is determined to satisfy the threshold $V_h$ has completed, the apparatus 20 includes means, such as the computing device 80 and, in one embodiment, processing circuitry 82, for causing the reset signal $\phi_{RST}$ may again be provided as shown in block 68 of FIG. 4, and the overall process may be repeated if further measurements of fluorescence emission of an object under analysis are desired. As shown in FIG. 6B, the reset signal $\phi_{RST}$ may be provided in one embodiment by second comparator 42 upon identifying that the second measure satisfies the threshold $V_h$. In the foregoing process, the various signals, such as the reset signal $\phi_{RST}$, the control signals signal $\phi_{S1}$, $\phi_{S2}$ and $\phi_{S3}$ and, in some embodiments, the clock signal $\phi_1$ are provided or at least directed to be provided by a computing device, such as the processing circuitry, as shown in FIG. 5 which controls operation of the circuit and the timing thereof.

As described above, a method, apparatus 20 and computer program product are provided in accordance with an example embodiment in order to determine the fluorescence lifetime in an efficient manner. In this regard, the method, apparatus and computer program product are configured to determine the fluorescence lifetime based upon electric charge generated by fluorescence emission during two overlapping periods of a single measurement cycle, namely, time periods $Q_1$ and $Q_2$. By capturing the electric charge during two overlapping time periods of single measurement cycle, the fluorescence lifetime may be determined more expeditiously and correspondingly the power consumed in conjunction with the fluorescence lifetime measurement, such as by the sensor 22, e.g., a light-sensitive diode 30, that converts incident light to current for fluorescence lifetime measurement purposes may be conserved.

FIG. 4 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 84 of an apparatus employing an embodiment of the present invention and executed by processing circuitry 82. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   storing electric charge generated by fluorescence emission during two overlapping time periods of a single measurement cycle to form first and second measures, wherein the electric charge generated during that segment of the two time periods during which the two time periods overlap is incorporated in the first measure and in the second measure;
   comparing the first measure to a threshold and the second measure to the threshold;
   determining first and second times at which the first and second measures, respectively, satisfy the threshold; and
   determining a fluorescence lifetime based at least in part upon the first and second times.

2. A method according to claim 1 wherein storing electric charge comprises separately storing electric charge generated by fluorescence emission during first, second and third non-overlapping time segments of the single measurement cycle, and wherein the method further comprises combining the electric charge stored during the first and second time segments to form the first measure and combining the electric charge stored during the second and third time segments to form the second measure.

3. A method according to claim 2 further comprising repeatedly storing electric charge and combining the electric charge during a plurality of measurement cycles prior to determining the fluorescence lifetime, wherein repeatedly storing electric charge during a respective time segment comprises integrating the electric charge generated by fluorescence emission during the respective time segment of the plurality of measurement cycles.

4. A method according to claim 1 further comprising causing the electric charge stored during the two overlapping time periods to be reset once the second measure satisfies the threshold.

5. A method according to claim 1 further comprising:
   sensing the fluorescence emission and generating a current based thereupon; and
   converting the current to a voltage representative of the fluorescence emission, prior to storing the electric charge.

6. An apparatus comprising:
   a plurality of capacitors configured to store electric charge generated by fluorescence emission during two overlapping time periods of a single measurement cycle to form first and second measures, wherein the electric charge generated during that segment of two time periods during which the two time periods overlap is incorporated in the first measure and the second measure;
   first and second comparators configured to compare the first and second measures, respectively, to a threshold; and
   processing circuitry configured to determine first and second times at which the first and second measures, respectively, satisfy the threshold, wherein the processing circuitry is further configured to determine a fluorescence lifetime based at least in part upon the first and second times.

7. An apparatus according to claim 6 wherein the plurality of capacitors comprise first, second and third capacitors configured to separately store electric charge generated by fluorescence emission during first, second and third non-overlapping time segments of the single measurement cycle, and wherein the apparatus further comprises a first summer configured to combine the electric charge stored during the first and second time segments to form the first measure and a second summer configured to combine the electric charge stored during the second and third time segments to form the second measure.

8. An apparatus according to claim 7 wherein the first, second and third capacitors are disposed in parallel and configured to be alternately, switchably connected to a signal line maintained at a voltage based upon the electric charge generated by the fluorescence emission.

9. An apparatus according to claim 7 wherein the first, second and third capacitors are further configured to repeatedly store electric charge and to combine the electric charge during a plurality of measurement cycles prior to determining the fluorescence lifetime, and wherein the first, second and third capacitors are configured to integrate the electric charge generated by fluorescence emission during a respective time segment of the plurality of measurement cycles by repeatedly storing electric charge during the respective time segment.

10. An apparatus according to claim 6 further comprising:
a light sensitive diode configured to sense the fluorescence emission and generate a current based thereupon;
a current-to-voltage converter configured to convert the current to a voltage representative of the fluorescence emission, prior to storing the electric charge; and
a plurality of intermediate capacitors configured to store the electric charge following conversion of the current during a plurality of non-overlapping time segments of the single measurement cycle.

11. An apparatus according to claim 10 wherein the plurality of intermediate capacitors comprise first, second and third intermediate capacitors configured to store the electric charge following conversion of the current during first, second and third non-overlapping time segments of the single measurement cycle.

12. An apparatus according to claim 11 wherein the first, second, and third capacitors are disposed in parallel and configured to be alternately, switchably connected to the current-to-voltage converter.

13. An apparatus according to claim 10 wherein the current-to-voltage converter comprises a transimpedence amplifier.

14. An apparatus according to claim 6 wherein the processing circuitry is further configured to causing the electric charge stored during the two overlapping time periods to be reset in response to the second measure satisfying the threshold.

15. A computer program product comprising at least one non-transitory computer-readable storage medium having computer executable program code instructions stored therein, the computer executable program code instructions comprising program code instructions configured, upon execution, to:
direct storage of electric charge generated by fluorescence emission during two overlapping time periods of a single measurement cycle to form first and second measures, wherein the electric charge generated during that segment of two time periods during which the two time periods overlap is incorporated in the first measure and the second measure;
determine first and second times at which the first and second measures, respectively, satisfy a threshold based upon a comparison of the first measure to the threshold and a comparison of the second measure to the threshold; and
determine a fluorescence lifetime based at least in part upon the first and second times.

16. A computer program product according to claim 15 wherein the program code instructions configured to direct storage of electric charge comprise program code instructions configured to control alternate, switchable connection of first, second and third storage devices to a signal line maintained at a voltage based upon the electric charge generated by the fluorescence emission such that the first, second and third storage devices store electric charge generated by fluorescence emission during first, second and third non-overlapping time segments of the single measurement cycle.

17. A computer program product according to claim 16 wherein the program code instructions configured to control the alternate, switchable connection of the first, second and third storage devices to the signal line further comprise program code instructions configured to repeatedly direct storage of the electric charge by the first, second and third storage devices in order to combine the electric charge during a plurality of measurement cycles prior to determining the fluorescence lifetime, and wherein the first, second and third storage devices are configured to integrate the electric charge generated by fluorescence emission during a respective time segment of the plurality of measurement cycles by repeatedly storing electric charge during the respective time segment.

18. A computer program product according to claim 15 wherein the computer executable program code instructions further comprise program code instructions configured to control alternate, switchable connection of first, second and third intermediate storage devices to an output of a current-to-voltage converter so as to store the electric charge following conversion of a current to a voltage representative of the fluorescence emission during first, second and third non-overlapping time segments of the single measurement cycle.

19. A computer program product according to claim 15 wherein the computer executable program code instructions further comprise program code instructions configured to cause the electric charge stored during the two overlapping time periods to be reset in response to the second measure satisfying the threshold.

* * * * *